US006791827B2

United States Patent
Kuo

(10) Patent No.: US 6,791,827 B2
(45) Date of Patent: Sep. 14, 2004

(54) WIRELESS MODULE FOR NOTEBOOK

(75) Inventor: Wen-Che Kuo, Taipei (TW)

(73) Assignee: Quanta Computer, Inc., Taoyuan (TW)

( * ) Notice: Subject to any disclaimer, the term of this patent is extended or adjusted under 35 U.S.C. 154(b) by 136 days.

(21) Appl. No.: 10/237,637

(22) Filed: Sep. 9, 2002

(65) Prior Publication Data

US 2004/0008479 A1 Jan. 15, 2004

(30) Foreign Application Priority Data

Jul. 9, 2002 (TW) ...................................... 91210433 U

(51) Int. Cl.$^7$ ............................................... G06F 1/16
(52) U.S. Cl. ....................... 361/683; 361/686; 343/702; 343/726
(58) Field of Search ................................ 361/681–686; 343/700, 702, 725–727

(56) References Cited

U.S. PATENT DOCUMENTS 5,619,395 A * 4/1997 McBride ..................... 361/683
5,768,163 A * 6/1998 Smith, II .................... 361/683
6,650,532 B2 * 11/2003 Shin ........................... 361/683
6,654,231 B2 * 11/2003 Teshima ..................... 361/681
2001/0009498 A1 * 7/2001 Oross et al. ................ 361/681

* cited by examiner

*Primary Examiner*—Lisa Lea-Edmonds
(74) *Attorney, Agent, or Firm*—Thomas, Kayden, Horstemeyer & Risley

(57) ABSTRACT

A wireless module for notebook is disclosed. The wireless module for notebook is combined on a logo area located on a LCD (Liquid Crystal Display) screen housing of notebook computer, wherein the logo area has at least one fixing holes (such as screw holes) used for fixing the wireless module on the notebook computer via at least one screws. Since the wireless module has only about 8 mm in thickness; the wireless module can be matched with the notebook computer smoothly and tightly. The wireless module comprises: at least one penetrating holes penetrating from the upper surface of wireless module to the lower surface thereof, and corresponding to the fixing holes; and a module contact for electrically connecting to a LCD contact point on the LCD screen housing of notebook computer.

7 Claims, 6 Drawing Sheets

WIRELESS MODULE FOR NOTEBOOK

FIELD OF THE INVENTION

The present invention relates to a wireless module for notebook computer, and more particularly, to a wireless modules that can be tightly and smoothly combined with a notebook computer.

BACKGROUND OF THE INVENTION

With the advent of wireless communication age and the broad application of various portable IT (Information Technology) products (such as notebook computers), there is increasing need for the portable IT products to be installed with a wireless module, so as to receive and transmit wireless signals. Especially, when Blue Tooth systems are more and more applied to various information appliances, a user needs to install a wireless module on a notebook computer, particularly on an existing notebook computer.

However, the existing notebook computer usually does not have space prepared in the original design for installing the wireless module, a lot of inconvenience and troubling are caused when the user intends to install the wireless module on the notebook computer. On the other hand, even for the notebook computers of future designs, it is also not easy to arrange appropriate space for installing the wireless module. Especially when it is desired to take into consideration the design to be light and thin, and not to conflict with the appearance of notebook computer, the difficulty level of design will be even much higher.

Hence, there is an urgent need currently to develop a wireless module that can be installed on a notebook computer simply and smoothly, and can be provided for use in existing or future notebook computers.

SUMMARY OF THE INVENTION

In view of the aforementioned background, it causes a lot of inconvenience and troubling to install a wireless module on a notebook computer. Especially for considering the design of lightness and thinness, and not conflicting with the appearance of notebook computer, the difficulty level of design is even much higher.

Hence, it is an object of the present invention to provide a wireless module for notebook, thereby enabling a user to install a wireless module on a notebook computer simply and smoothly without the inconvenience and troubling originally caused by installing the wireless module on the notebook computer.

Moreover, the present invention also provides a wireless module for notebook, thereby providing the wireless module that can be combined with a notebook computer as one body, thus having high degree of integrality and appearance harmony.

According to the aforementioned objects, the present invention discloses a wireless module for notebook. The wireless module for notebook is to utilize a logo zone located on the outside of LCD (Liquid Crystal Display) screen housing of a notebook computer to combine with a wireless module, wherein the logo zone has at least one fixing holes (such as screw holes), and exposes a LCD screen contact point The wireless module for notebook of the present invention comprises: at least one through hole, wherein the through holes penetrate from an upper surface of the wireless module to a lower surface thereof, and correspond to at least one fixing hole of the logo zone located on the outside of LCD screen housing, whereby at least one fixing element (such as screws) can be used for fastening the wireless module to the notebook computer; and a module contact point, used for electrically connecting to the LCD screen contact point of the notebook computer. According to a preferred embodiment of the present invention, the wireless module for notebook comprises: an upper cover; an indicator holder having an indicator; a switch component, wherein the switch component is electrically connected to the light holder via an indicator connecting plate; an upper cover base component, wherein the upper cover base component has at least one through hole; a L-shape member, wherein one of the through holes penetrates the L-shape member and the upper cover base component respectively, and the L-shape member has a contact element of L-shape member, thereby electrically connecting to a switch holder via a switch connecting plate, and the lower surface of the L-shape member has a module contact point used for electrically connecting to the LCD screen contact point of the notebook computer; a circuit component, electrically connected to the contact element of L-shape member; and a lower cover.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention discloses a wireless module for notebook. The present invention is to use a logo zone located on the outside of LCD screen housing of a notebook computer to combine a wireless module, wherein the logo zone has fixing holes (such as screw holes), whereby fixing elements (such as screws) can be used for fastening the wireless module to the notebook computer.

Figure 1:
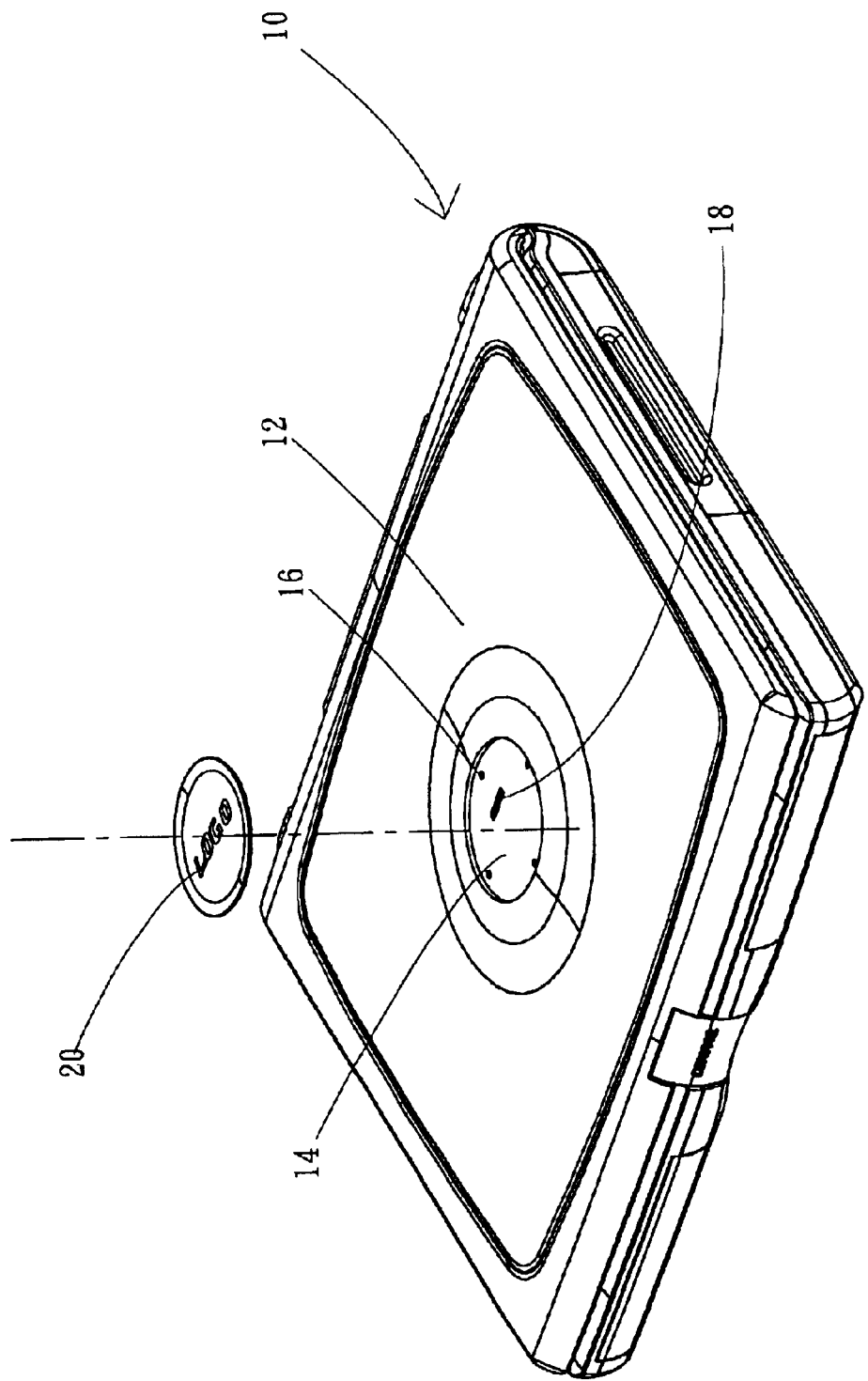
FIG. 1 is a schematic explosive view of a conventional notebook computer and a logo.

Referring to FIG. 1, FIG. 1 is a schematic explosive view of a conventional notebook computer and a logo, wherein a logo 20 is usually adhered by glue to a computer logo zone 14 located on the outside of LCD screen housing 12 of notebook computer 10. After the logo 20 is detached, it is shown that the computer logo zone 14 has at least one fixing hole 16 and a LCD screen contact point 18. Hence, the present invention utilizes the computer logo zone 14, the fixing holes 16, and the LCD screen contact point 18 to install a wireless module. It is worthy to be noted that, if the notebook computer 10 does have the fixing holes 16 and the LCD screen contact point 18, then the fixing holes 16 and the LCD screen contact point 18 have to be fabricated on the LCD screen housing 12, wherein the fabrication of these elements is not difficult to those who are skilled in the art. On the other hand, if the computer logo zone 14 of the notebook computer 10 is not used for installing the wireless module, any appropriate surface portion on the LCD screen housing 12 can be used instead.

Figure 2:
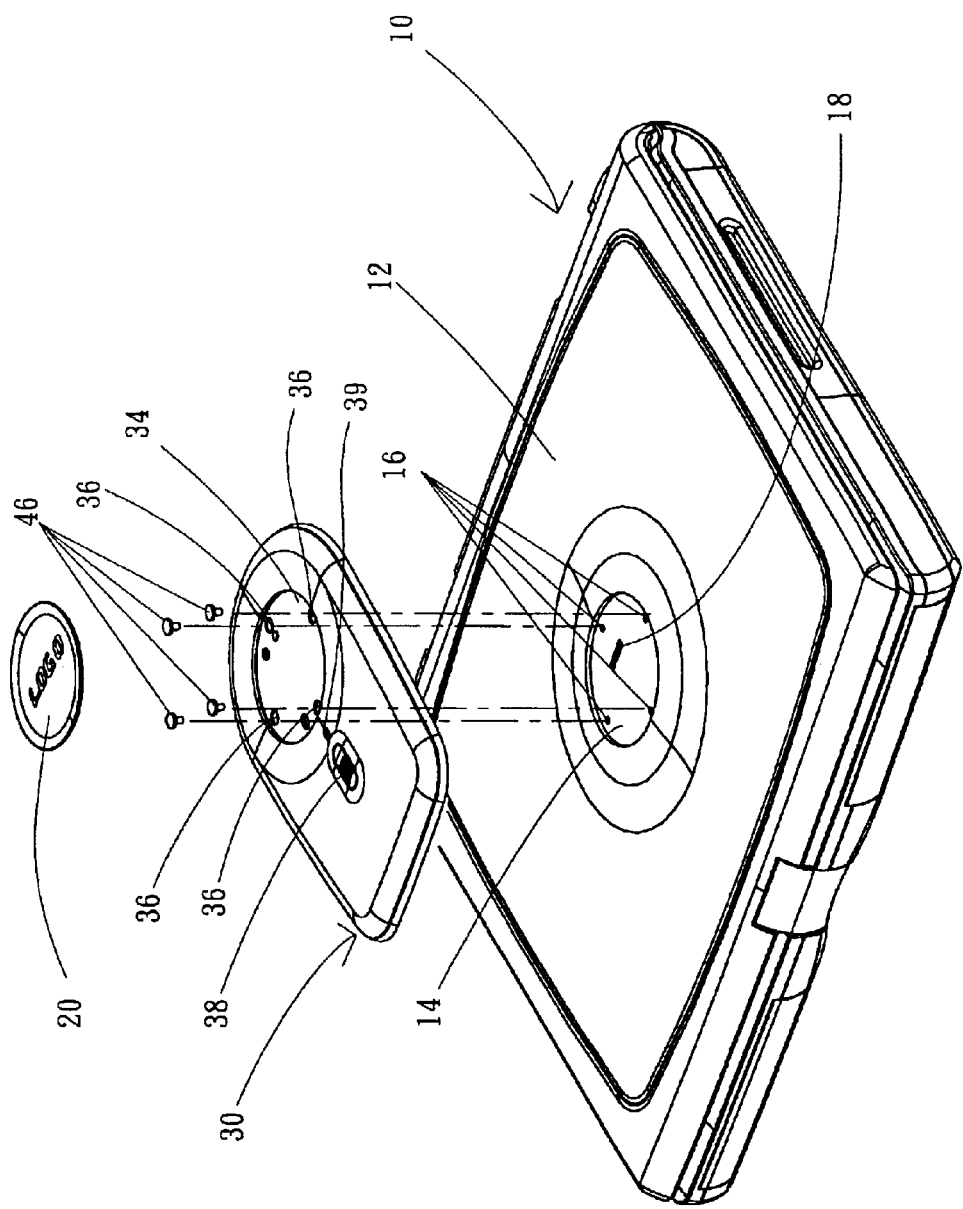
FIG. 2 is a schematic explosive view of a wireless module, a notebook computer and a logo, according to a preferred embodiment of the present invention.

Referring to FIG. 2, FIG. 2 is a schematic explosive view of a wireless module, a notebook computer and a logo, according to a preferred embodiment of the present invention. A wireless module 30 for notebook of the present invention comprises: at least one through hole 36; and a module contact point (not shown) located on a lower surface of the wireless module 30 for connecting to the LCD screen contact point 18 of the notebook computer 10, wherein the through holes 36 penetrate from an upper surface of the wireless module 30 to the lower surface thereof, and correspond to the fixing holes 16 on the computer logo zone 14 of the LCD screen housing 12 of the notebook computer 10, whereby fixing elements 46 (such as screws) can be used for fastening the wireless module 30 to the notebook computer 10. The upper surface of the wireless module 30 also has a module logo zone 34, whereby the logo 20 that is originally attached to the notebook computer 10 can be adhered to the wireless module 30 alternately. The wireless module further comprises: a switch 38 and an indicator 39.

Figure 3:
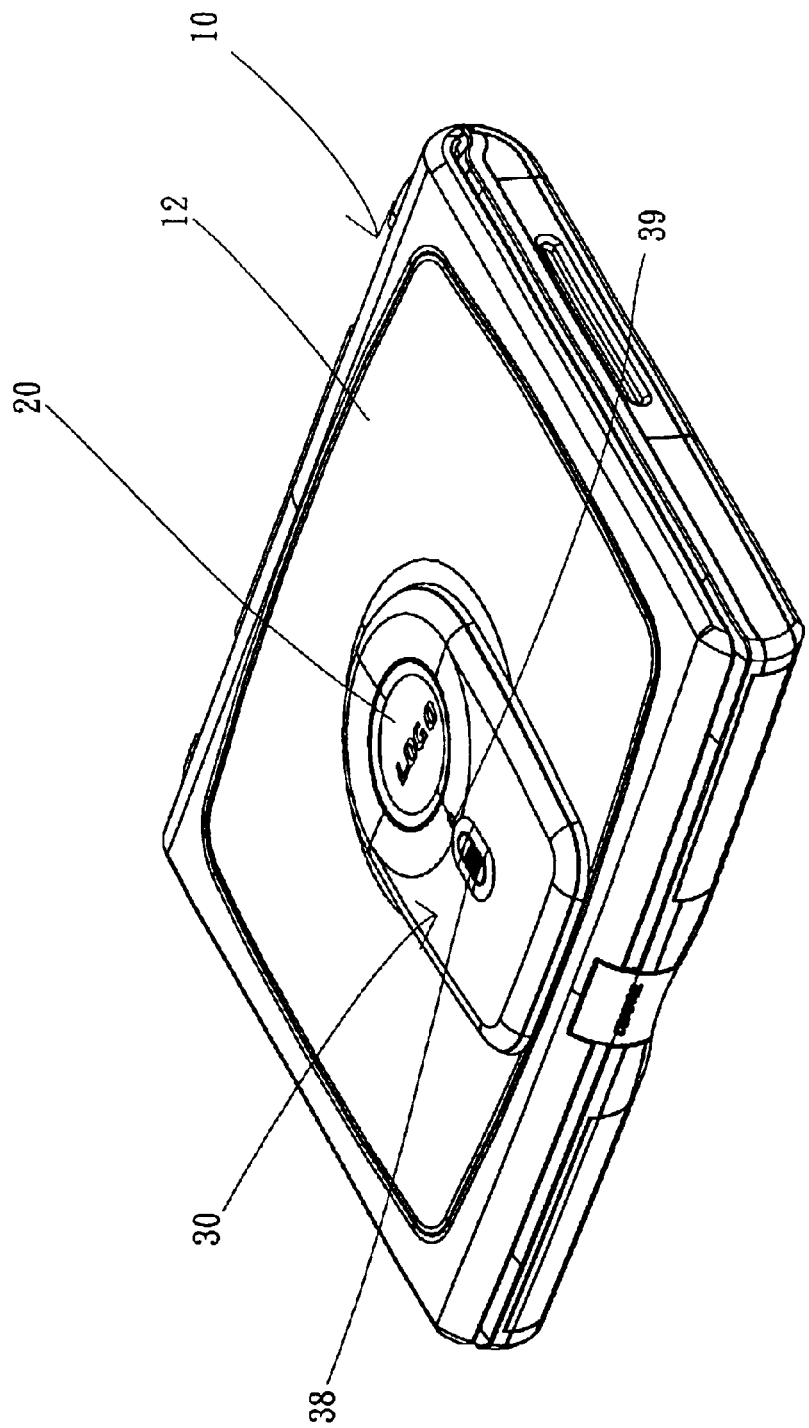
FIG. 3 is a schematic view showing the assembly of the wireless module, the notebook computer and the logo, according to the preferred embodiment of the present invention.

Referring to FIG. 3, FIG. 3 is a schematic view showing the assembly of the wireless module, the notebook computer and the logo, according to the preferred embodiment of the present invention. Since the wireless module 30 of the preferred embodiment of the present invention is only about such as 8 mm in thickness, it can be known from FIG. 3 that the combination of the wireless module 30, the notebook computer 10 and the logo 20 is almost close to a one-piece formation, wherein not only there is no confliction with the appearance of notebook computer, but also there is very good tightness between the wireless module 30 and the LCD screen housing 12, and further, the location of the switch 38 and that of the indicator 39 are very convenient for operation and display.

Figure 4:
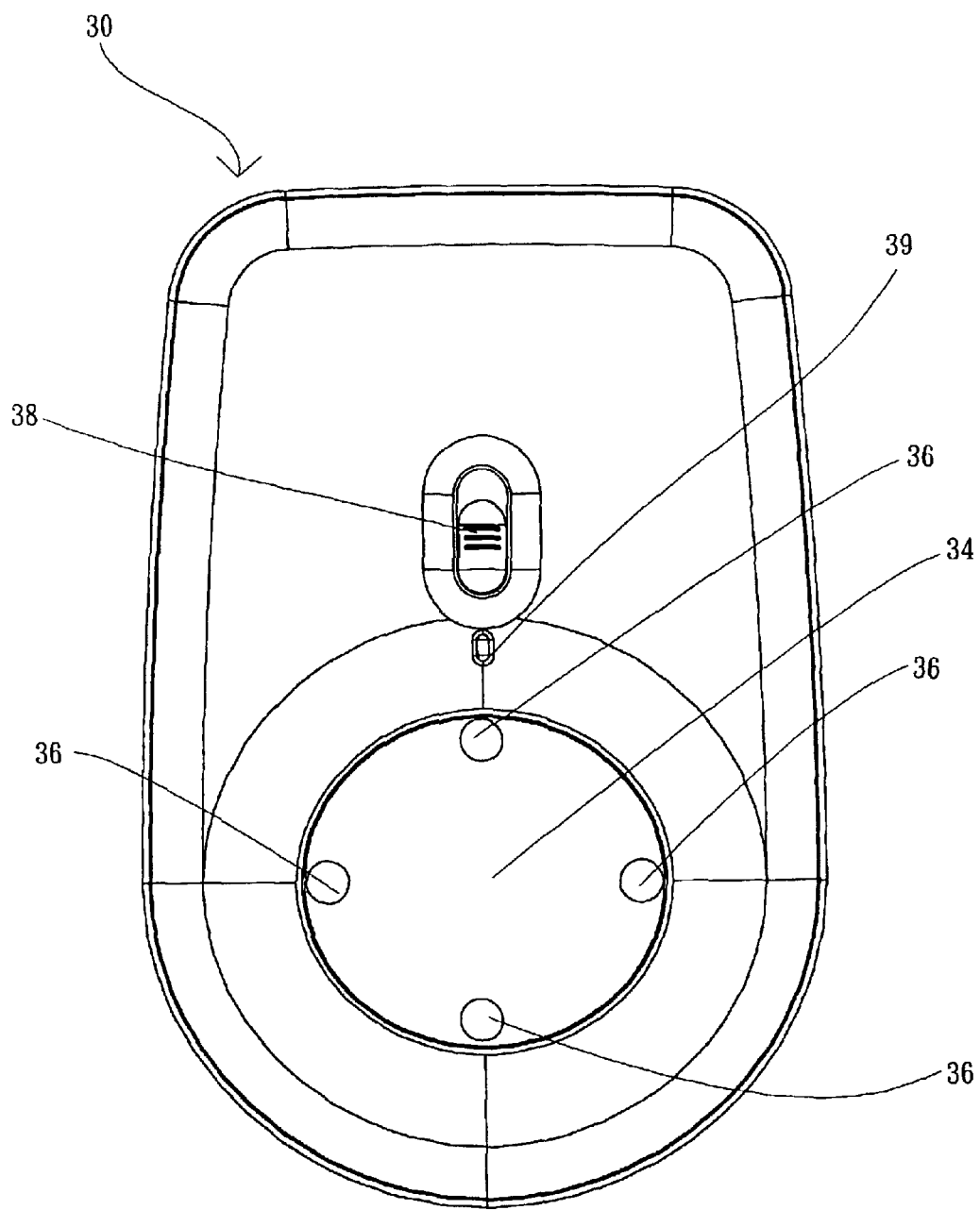
FIG. 4 is a schematic top view of the wireless module according to the preferred embodiment of the present invention.
Figure 5:
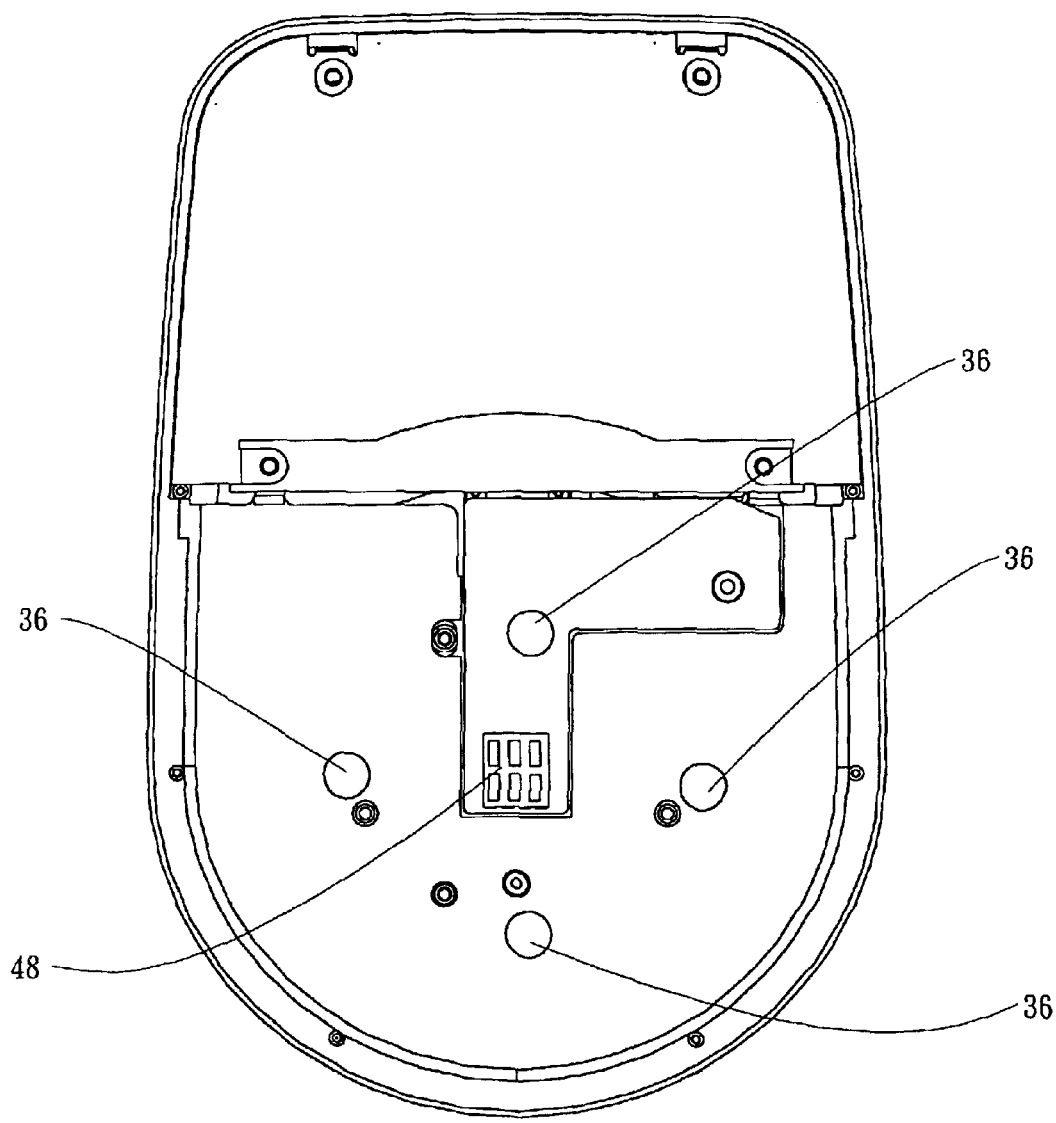
FIG. 5 is a schematic bottom view of the wireless module according to the preferred embodiment of the present invention.
Figure 6:
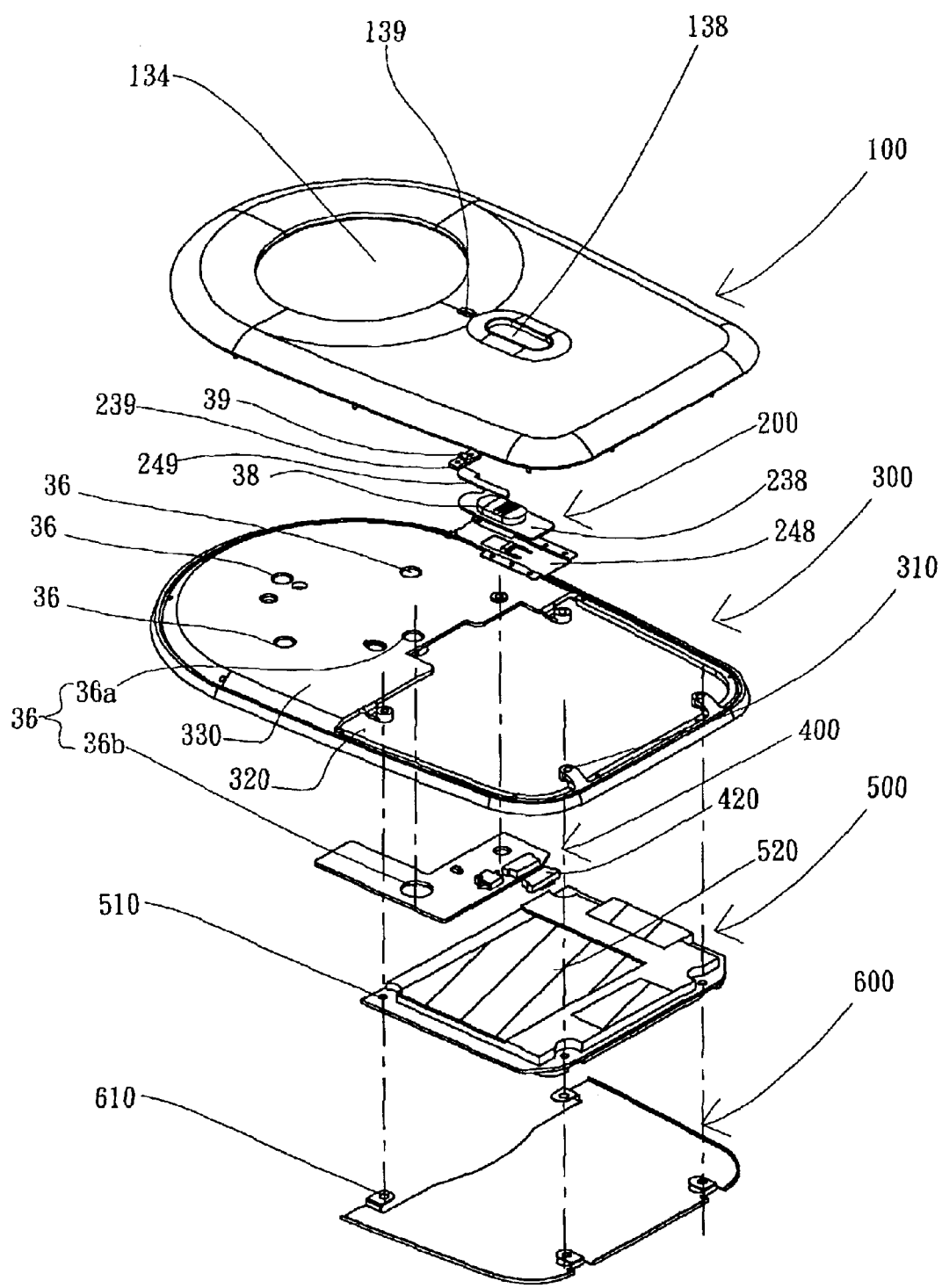
FIG. 6 is a schematic explosive view of the wireless module, according to a preferred embodiment of the present invention.

Referring to FIG. 4, FIG. 5 and FIG. 6, according to a preferred embodiment of the present invention, FIG. 4 is a schematic top view of the wireless module; FIG. 5 is a schematic bottom view of the wireless module; and FIG. 6 is a schematic explosive view of the wireless module. It is noted that FIG. 4, FIG. 5 and FIG. 6 are merely shown as an example for explaining the present invention, and the wireless module of the present invention can have different structures, as long as the wireless module can be conveniently installed on the logo zone located on the outside of LCD screen housing of the notebook computer.

Such as shown in FIG. 4, FIG. 5 and FIG. 6, according to the preferred embodiment of the present invention, the wireless module 30 for notebook comprises: an upper cover 100; an indicator holder 239 having an indicator 39; a switch component 200, wherein the switch component 200 is composed of a switch holder 238 and a switch 38 located on the switch holder 238, and the switch component 200 is electrically connected to the indicator holder 239 via an indicator connecting plate 249; an upper cover base component 300, wherein the upper cover base component 300 has a base opening 320 and a base plate 330, and the base plate 330 has the at least one through holes 36; a L-shape member 400, wherein one of the through holes 36 penetrates the L-shape member 400 and the base plate 330 respectively (such as through holes 36a and 36b shown in FIG. 6), and the L-shape member 400 has a contact element 420 of L-shape member, such as a connector, whereby the L-shape member 400 can be electrically connected to the switch holder 238 via a switch connecting plate 248, and a lower surface of the L-shape member 400 has a module contact point 48 as shown in FIG. 5; a circuit component 500, wherein a circuit element 520 located on the circuit component 500 are electrically connected to the contact element 420 of L-shape member; and a lower cover 600.

The upper cover 100 is inset in the upper cover base component 300 by using tenons. The upper cover 100 also has a logo opening 134, a switch opening 138 and an indicator opening 139, respectively used for exposing the module logo zone 34 (FIG. 4), the switch 38 and the indicator 39, which are located on the base plate 330. The upper cover base component 300, the circuit component 500 and the lower cover 600 are combined together sequentially via connecting holes 310, 510 and 610 that are mutually corresponded. When fixing elements (not shown) are used to install the wireless module 30 on the notebook computer (not shown) via the through holes 36, the module contact point 48 as shown in FIG. 5 and the LCD screen contact point (such as the LCD screen contact point 18 as shown in FIG. 2) are electrically connected.

Hence, it is an advantage of the present invention to provide a wireless module for notebook. By applying the present invention, a user can install a wireless module on a notebook computer simply and smoothly without the inconvenience and troubling originally caused by installing other wireless module on the notebook computer.

It is the other advantage of the present invention to provide a wireless module for notebook. By applying the present invention, the wireless module can be combined with a notebook computer as one body, thus having high degree of integrality and harmony of appearance.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A wireless module for notebook, wherein said wireless module is combined with a surface portion on a LCD screen housing of a notebook computer, and said surface portion has at least one fixing part and a LCD screen contact point, said wireless module comprising:

a cover;

a switch component, implemented on said cover, wherein said switch component is composed of a switch holder and a switch located on said switch holder;

a cover base component, implemented under said cover, wherein said cover base component has a base plate, and said base plate has at least one through part, and said cover is combined with said cover base component;

a L-shape member, wherein said through hole penetrates said L-shape member and said base plate respectively, and said L-shape member has a contact element of L-shape member for electrically connecting to said switch holder via a switch connecting plate, and a lower surface of said L-shape member has a module contact point, and, while at least one fixing element is used for installing said wireless module for notebook on said notebook computer, said module contact point and said LCD screen contact point of said notebook computer have to be electrically connected; and a circuit component, wherein a circuit element of said circuit component is electrically connected to said contact point of L-shape member.

2. The wireless module for notebook of claim 1, further comprising an indicator holder, wherein said indicator holder is electrically connected to said switch component via an indicator connecting plate.

3. The wireless module for notebook of claim 2, wherein said cover further has a switch opening, an indicator opening and a logo opening, respectively used for exposing said switch, an indicator of said indicator holder, and a module logo zone located on said base plate, and said module logo zone is used for adhering a logo.

4. The wireless module for notebook of claim 1, wherein said cover is inset into said cover base component by using tenons.

5. The wireless module for notebook of claim 1, wherein said cover base component and said circuit component are combined together sequentially via a plurality of connecting parts that are mutually corresponded.

6. The wireless module for notebook of claim 1, wherein said surface portion is a computer logo zone, and said computer logo zone is originally used for adhering a logo.

7. The wireless module for notebook of claim 1, wherein said fixing element is a screw.

* * * * *